(12) United States Patent
Oh et al.

(10) Patent No.: US 10,141,082 B2
(45) Date of Patent: Nov. 27, 2018

(54) OXIDATION RESISTANT COPPER NANOPARTICLES AND METHOD FOR PRODUCING SAME

(71) Applicant: KOREA INSTITUTE OF SCIENCE AND TECHNOLOGY, Seoul (KR)

(72) Inventors: Young-Jei Oh, Seoul (KR); Se-Hoon Kim, Mungyeong-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 375 days.

(21) Appl. No.: 14/440,230

(22) PCT Filed: Nov. 2, 2012

(86) PCT No.: PCT/KR2012/009189
§ 371 (c)(1),
(2) Date: May 1, 2015

(87) PCT Pub. No.: WO2014/069698
PCT Pub. Date: May 8, 2014

(65) Prior Publication Data
US 2015/0344715 A1     Dec. 3, 2015

(30) Foreign Application Priority Data

Nov. 2, 2012 (KR) ......................... 10-2012-0123478

(51) Int. Cl.
*H01B 1/02* (2006.01)
*B22F 1/00* (2006.01)
(Continued)

(52) U.S. Cl.
CPC ............. *H01B 1/02* (2013.01); *B22F 1/0007* (2013.01); *B22F 1/0018* (2013.01);
(Continued)

(58) Field of Classification Search
CPC . H01B 1/02; H01B 1/026; H01B 1/20; H01B 1/22; B22F 1/0007; B22F 1/0011;
(Continued)

(56) References Cited

U.S. PATENT DOCUMENTS 5,215,820 A * 6/1993 Hosokawa ........... C08G 61/123
428/328
7,534,283 B2 * 5/2009 Yamada ............. C22B 15/0021
75/373

(Continued)

FOREIGN PATENT DOCUMENTS

JP    2004183060 A * 7/2004
JP    2007254846 A * 10/2007 ............ B22F 1/0014
(Continued)

OTHER PUBLICATIONS

English machine translation of Sakagami et al. JP 2007-254846 A (2007).*

(Continued)

*Primary Examiner* — Harold Y Pyon
*Assistant Examiner* — Matthew R Diaz
(74) *Attorney, Agent, or Firm* — Ladas & Parry LLP; Loren K. Thompson

(57) ABSTRACT

The present invention relates to oxidation resistant copper nanoparticles, and to a method for producing the same, which includes the steps of: preparing a first solution composed of a solvent, a polymer, and an organic acid; stirring the first solution to produce a first stirred solution; mixing the first stirred solution, a copper precursor, and a first reducing agent to produce a second reactant solution; mixing a second reducing agent with the second reactant solution to produce a third reactant solution; and collecting copper nanoparticles separated from the third reactant solution, which is a very simple process performing the reactions at (Continued)

a normal temperature under atmospheric conditions to produce copper nanoparticles, and an eco-friendly method firstly applying a watery solvent so as to achieve mass production of copper nanoparticles only by mixing solutions. In particular, the copper nanoparticles according to the present invention may have excellent oxidation resistant properties to prevent them from being oxidized for three months or more even when preserved at a normal temperature under atmospheric conditions.

19 Claims, 10 Drawing Sheets

(51) Int. Cl.
B22F 9/24 (2006.01)
C09D 11/52 (2014.01)
B22F 1/02 (2006.01)
B82Y 40/00 (2011.01)

(52) U.S. Cl.
CPC .......... *B22F 1/0025* (2013.01); *B22F 1/0044* (2013.01); *B22F 1/0048* (2013.01); *B22F 1/0062* (2013.01); *B22F 1/02* (2013.01); *B22F 9/24* (2013.01); *C09D 11/52* (2013.01); *B22F 2301/10* (2013.01); *B82Y 40/00* (2013.01)

(58) Field of Classification Search
CPC .... B22F 1/0018; B22F 1/0022; B22F 1/0025; B22F 1/0044; B22F 1/0048; B22F 1/0062; B22F 1/02; B22F 1/025; B22F 9/24; B22F 2301/10; C09D 11/52
See application file for complete search history.

(56) References Cited

U.S. PATENT DOCUMENTS

| | | | | |
|---|---|---|---|---|
| 7,785,392 | B2* | 8/2010 | Shim | B22F 1/0018 423/604 |
| 2007/0180954 | A1* | 8/2007 | Kim | B22F 1/0018 75/373 |
| 2008/0004358 | A1* | 1/2008 | Aoki | B22F 1/0022 516/97 |
| 2008/0138643 | A1* | 6/2008 | Lee | B22F 1/0018 428/570 |
| 2012/0027934 | A1* | 2/2012 | Lee | C01G 3/02 427/217 |

FOREIGN PATENT DOCUMENTS

| | | | | |
|---|---|---|---|---|
| JP | 2008-050661 A | | 3/2008 | |
| JP | 2008088518 A | * | 4/2008 | ............ B22F 1/0018 |
| JP | 2008-169474 A | | 7/2008 | |
| KR | 1020070080467 A | | 8/2007 | |
| KR | 1020090012028 A | | 2/2009 | |
| KR | 1020110125145 A | | 11/2011 | |
| KR | 1020120038878 A | | 4/2012 | |
| KR | 1020120045711 A | | 5/2012 | |

OTHER PUBLICATIONS

Hielscher "Ultrasonic production of nano-size dispersions and emulsions." ENS 2005. TIMA Editions. pp. 138-143. (2005).*
English machine translation of Bessho et al. JP 2008-088518 A (2008).*
English machine translation of Sakagami et al. (JP 2004-183060 A). (Year: 2004).*
International Search Report dated May 7, 2013; PCT/KR2012/009189.

* cited by examiner

OXIDATION RESISTANT COPPER NANOPARTICLES AND METHOD FOR PRODUCING SAME

TECHNICAL FIELD

The present invention relates to a method for producing oxidation resistant copper nanoparticles and oxidation resistant copper nanoparticles, and more particularly, to a method capable of massively producing copper nanoparticles with an excellent oxidation resistance, which may be stored at room temperature under air condition while produced by a simple and eco-friendly method that a watery solvent may be applied at room temperature.

BACKGROUND ART

In order to materialize a conductive line and an active element, it is required to develop a nano ink for forming a conductive pattern, and there are gold, silver, and copper as a type of a conductive particle used for the nano ink.

However, since gold (Au) and silver (Ag) are expensive, studies have been performed for producing a nano ink by using an inexpensive non-metal such as copper (Cu), but copper (Cu) is feasibly oxidized as compared to a noble metal such as gold or silver, and thus, has a problem in that it is not easy to produce copper nanoparticles having oxidation resistant properties. For this reason, copper nanoparticles hitherto developed are mostly those which are usually mixed in an organic solvent.

Korean Patent Laid-Open Publication No. 2011-0125145 discloses copper nanoparticles with a size of about 30 nm or more, which were produced by using an organic solvent such as toluene at a temperature of 70° C. to 110° C. under the nitrogen atmosphere, and Korean Patent Laid-Open Publication No. 2007-0080467 discloses that copper nanoparticles having a size of 70 nm to 130 nm were prepared by using a reduction or inert atmosphere at a temperature of 200° C. to 350° C. However, the above-described inventions have disadvantages in that copper nanoparticles have a large size, a high-temperature experimental atmosphere is required to produce the copper nanoparticles, and an additional process is demanded.

DISCLOSURE OF THE INVENTION

Therefore, an object of the present invention is to provide a method capable of simply producing copper nanoparticles, in which the reactions may be simply conducted under the condition of room temperature and air atmosphere, without any additional process such as a temperature increase that is conducted in a hydrothermal synthesis, and the like. The method of the present invention relates to a production method capable of massively produce copper nanoparticles with an excellent oxidation resistance in an eco-friendly manner in that excellent oxidation resistant copper nanoparticles may be produced only by mixing solutions while firstly applying a watery solvent.

The oxidation resistant copper nanoparticles prepared by the production method may have excellent oxidation resistance capable of preventing them from being oxidized for three months or more even when stored at room temperature under atmospheric conditions, and being storable. Accordingly, it is possible to provide copper nanoparticles having excellent long-term storability, and these copper nanoparticles may be applied to a copper ink which is necessary for the formation of a conductive pattern and the like to be included in a display, RFID, a flexible substrate, a solar cell, TFT, a memory device, and the like.

To achieve these and other advantages and in accordance with the purpose of the present invention, as embodied and broadly described herein, there is provided a method for producing the copper nanoparticles according to an exemplary embodiment of the present invention, comprising the steps of: preparing a first solution composed of a solvent, a polymer, and an organic acid; stirring the first solution to produce a first stirred solution; mixing the first stirred solution, a copper precursor, and a first reducing agent to produce a second reactant solution; mixing a second reducing agent with the second reactant solution and reacting the mixture for 30 minutes to 5 hours to produce a third reactant solution; and collecting copper nanoparticles separated from the third reactant solution.

The reaction step may include a first reaction step of preparing a second solution comprising the first stirred solution and a copper precursor, and reacting the second solution for 30 minutes to 5 hours to produce a first reactant solution, and a second reaction step of mixing a first reducing agent with the first reactant solution, and reacting the mixture for 30 minutes to 5 hours to produce a second reactant solution.

The organic acid may be any one selected from the group consisting of Ascorbic acid, Erythorbic acid, Glucuronolactone, Triformin (2,3-diformyloxypropyl formate) and a combination thereof.

The stirring of the first solution may be conducted by an ultrasonic dispersion treatment at 50 to 500 W for 1 to 20 minutes.

The copper precursor may be any one selected from the group consisting of copper sulfate ($CuSO_4$), copper(I) chloride (CuCl), copper(II) chloride ($CuCl_2$), copper nitrate ($Cu(NO_3)_2$), copper acetate ($CH_3COOCu$), copper carbonate ($CuCO_3$), copper(II) cyanide ($Cu(CN)_2$), copper(I) iodide (CuI) and a combination thereof.

The first reducing agent and the second reducing agent may be each independently selected from the group consisting of hydrazine ($N_2H_4H_2O$), sodium borohydride ($NaBH_4$), sodium chloride (NaCl), sodium hydroxide (NaOH), aqueous ammonia ($NH_4OH$), potassium bromide (KBr), and a combination thereof.

The solvent may be any one selected from the group consisting of water, methanol, ethanol, butanol, acetone, isopropyl alcohol, ethylene glycol, diethylene glycol, toluene, N-methyl-2-pyrrolidone and a combination thereof.

The polymer may be any one selected from the group consisting of polyacetylene, polyaniline, polypyrrole, polythiopene, polyvinylpyrrolidone, poly(3,4-ethylenedioxythiophene) and a combination thereof.

The copper nanoparticles may be spherical or needle-shaped.

The copper nanoparticles may have a size of 10 nm or less.

The first reducing agent may be applied at a molar ratio of 0.1 to 1 based on the copper precursor.

The second reducing agent may be applied at a molar ratio of 0.01 to 0.1 based on the copper precursor.

The third reactant solution may have a pH of 6 to 8.

The oxidation resistant copper nanoparticles according to another exemplary embodiment of the present invention include copper nanoparticles and a reduced polymer layer surrounding the copper nanoparticles.

The polymer layer may include a polymer from which an $O^{2-}$ group is removed.

The polymer may be composed of any one selected from the group consisting of reduced polyacetylene, reduced polyaniline, reduced polypyrrole, reduced polythiopene, reduced poly(3,4-ethylenedioxythiophene), reduced polyvinylpyrrolidone and a combination thereof.

The oxidation resistant copper nanoparticles may maintain oxidation resistant properties for 90 days under the conditions of air atmosphere and 20° C.

The oxidation resistant copper nanoparticles may have a pH of 6 to 8.

The oxidation copper nanoparticles may have a size of 10 nm or less.

The copper ink according to still another exemplary embodiment of the present invention includes the oxidation resistant copper nanoparticles.

In the present invention, a term containing an ordinal number such as first or second may be used, but is used only for the purpose of differentiating one element from the other elements when various constituent elements are described, and the respective constituent elements are not limited by the terms.

Hereinafter, the present invention will be described in more detail.

The method for producing copper nanoparticles according to an exemplary embodiment of the present invention includes the steps of producing a solution, reacting a mixture, producing a reactant, and collecting a product.

The step of producing a solution includes a procedure of preparing a first solution composed of a solvent, a polymer, and an organic acid, and stirring the first solution to produce a first stirred solution.

Any solvent may be applied as long as it may dissolve a copper precursor, and specifically, be any one selected from the group consisting of water, methanol, ethanol, butanol, acetone, isopropyl alcohol, ethylene glycol, diethylene glycol, toluene, N-methyl-2-pyrrolidone and a combination thereof. The water may be any one selected from the group consisting of distilled water, deionized water and a combination thereof.

When water is applied as the solvent, copper nanoparticles may be produced by a method which is advantageous in massively producing copper nanoparticles, and is also eco-friendly as compared to the case where an organic solvent is used.

As the polymer, a conductive or non-conductive polymer may be utilized, and specifically, it is possible to use any one selected from the group consisting of polyacetylene, polyaniline, polypyrrole, polythiopene, poly(3,4-ethylenedioxythiophene) and a combination thereof as the conductive polymer, and a polymer containing polyvinylpyrrolidone may be used as the non-conductive polymer. When the first solution includes the polymer, it is possible to prevent growth and oxidation of the particles.

Preferably, the polymer may be polyvinylpyrrolidone. When polyvinylpyrrolidone is applied as the polymer, the nanoparticles may be produced by an eco-friendly method because the polymer may prevent the growth of nanoparticles, and is dissolved well even when water is applied as a solvent.

The first solution further includes an organic acid together with the solvent and the polymer. The organic acid may be any one selected from the group consisting of Ascorbic acid, Erythorbic acid, Glucuronolactone, Triformin (2,3-diformyloxypropyl formate) and a combination thereof, and preferably an organic acid containing ascorbic acid.

The organic acid may serve to remove the $O^{2-}$ group which may be included in the polymer. Specifically, when polyvinylpyrrolidone is used as the polymer, it is possible to prevent oxidation of copper nanoparticles by a component to be oxidized while copper nanoparticles are formed, but it is likely that additional oxidation of copper nanoparticles occurs due to the $O^{2-}$ group attached to the polyvinylpyrrolidone itself, and at this time, the $O^{2-}$ attached to the polyvinylpyrrolidone may be detached where an organic acid is used, such that the oxidation of copper nanoparticles may be minimally suppressed.

The stirring of the first solution may be conducted by a mechanical method, and may be performed at room temperature. Here, room temperature means a temperature when a temperature increase does not occur, and means a temperature of 5° C. to 28° C., generally a temperature of 18° C. to 25° C. Since a temperature increase for dissolution and reaction is not needed in that the stirring of the first solution is conducted at room temperature, an additional process is not needed and copper nanoparticles may be prepared by a simple production process.

The stirring of the first solution may be performed by an ultrasonic dispersion treatment, and in this case, the first solution may be uniformly dispersed. The ultrasonic dispersion treatment may be conducted preferably at a power of 50 W to 500 W for 1 to 20 minutes, and in this case, the first solution may be uniformly dispersed, and an oxidation component such as oxygen anions included in the first solution may be removed.

The reaction step includes a procedure of mixing a copper precursor and a first reducing agent with the first stirred solution to produce a second reactant solution.

In the reaction step, an organic acid and a polymer, which are included in the first stirred solution, may cause a reduction reaction while being mixed with the copper precursor and the first reducing agent, and it is possible to produce copper nanoparticles in which oxidation is prevented from the production step.

The reaction step may include a first reaction step and a second reaction step.

The first reaction step includes a procedure of preparing the first stirred solution containing an organic acid and a second solution containing a copper precursor, and reacting the second solution for 30 minutes to 5 hours to produce a first reactant solution.

When the time for the reaction in the first reaction step is within the aforementioned range, there is an excellent effect which may maximally increase the oxidation resistance period of copper nanoparticles to be produced. More preferably, the reaction in the first reaction step may be conducted within a range of 30 minutes to 2 hours. In particular, when the first reducing agent has a property of absorbing oxygen anions (for example, the case where NaOH is applied as the first reducing agent), the reaction time in the first reaction step may be set to 30 minutes to 2 hours in order to minimize the absorption of oxygen anions.

As the copper precursor, a compound may be applied as long as it may form a copper ion in a solution, and specifically, the copper precursor may be any one selected from the group consisting of copper sulfate ($CuSO_4$), copper(I) chloride (CuCl), copper(II) chloride ($CuCl_2$), copper nitrate ($Cu(NO_3)_2$), copper acetate ($CH_3COOCu$), copper carbonate ($CuCO_3$), copper(II) cyanide ($Cu(CN)_2$), copper(I) iodide (CuI) and a combination thereof. The copper precursor includes the above-listed compound and a hydrate thereof.

The first reaction step allows copper ions required for forming copper nanoparticles by mixing the copper precursor with the first stirred solution and dissolving the mixture to be sufficiently formed in the first reactant solution.

Since the reactions of the first reaction step are conducted at room temperature state instead of a high temperature condition through a temperature increase, an additional process is not required during the production process, and the process may be significantly simplified.

The second reaction step includes a procedure of mixing a first reducing agent with the first reactant solution and reacting the mixture for 30 minutes to 5 hours to produce a second reactant solution. The mixing time in the second reaction step may be a time suitable for forming copper nanoparticles by being reacted with the first reducing agent, and reducing copper ions present in the first reactant solution, and preferably, the reaction in the second reaction step may be conducted within a range of 1 hour to 2 hours.

In the second reaction step, the first reducing agent serves to reduce copper ions included in the first reactant solution for forming copper nanoparticles.

The first reducing agent may be selected from the group consisting of hydrazine ($N_2H_4H_2O$), sodium borohydride ($NaBH_4$), sodium chloride (NaCl), sodium hydroxide (NaOH), aqueous ammonia ($NH_4OH$), potassium bromide (KBr), and a combination thereof, and preferably, the first reducing agent may be sodium hydroxide.

The first reducing agent may be applied at a molar ratio of 0.1 to 1 based on the copper precursor. When the first reducing agent is applied at a molar ratio of 0.1 to 1 based on the copper precursor, it is possible to maximally increase the oxidation resistance period of copper nanoparticles produced.

The production step includes a procedure of mixing a second reducing agent with the second reactant solution and reacting the mixture for 10 minutes to 5 hours to produce a third reactant solution. When the mixing time in the production step is set to the above-described range, it is possible to appropriately form excellent oxidation resistant copper nanoparticles by reacting the second reactant solution with the second reducing agent. Preferably, the reaction in the production step may be conducted within a range of 30 minutes to 2 hours.

In the production step, the second reducing agent may be selected from the group consisting of hydrazine ($N_2H_4H_2O$), sodium borohydride ($NaBH_4$), sodium chloride (NaCl), sodium hydroxide (NaOH), aqueous ammonia ($NH_4OH$), potassium bromide (KBr), and a combination thereof, and preferably, the second reducing agent may be sodium borohydride.

As the second reducing agent, a reducing agent such as the first reducing agent may also be applied, and different materials may also be applied.

The first reducing agent and the second reducing agent may be applied at different times. That is to say, after a first reducing agent is added, a reaction is conducted for a predetermined time, and a second reducing agent is further applied to induce the reaction again, because a first reaction solution is acidified during the reaction procedure, and the acidified solution needs to be neutralized before the final collection step.

The second reducing agent may be applied at a molar ratio of 0.01 to 1 based on the copper precursor. When the second reducing agent may be applied at a molar ratio of 0.01 to 1 based on the copper precursor, the second reducing agent may neutralize acidic components in a solution generated by the first reducing agent, and copper nanoparticles may be produced by an eco-friendly production method.

The production step may include a procedure of terminating the reaction, and the termination of the reaction may be at a time point when the color of the third reactant solution turns black due to the reduction of copper ions.

For the method for producing the copper nanoparticles, the pH of the solution may vary according to each step. In the solution production step and the first reaction step, a state where the solution is acidic is maintained by the effect of the organic acid, but the acidic state may be changed into the neutral or basic state by the first reducing agent used in the second reaction step, and the neutral state is preferred in the production step.

In the production step, the third reactant solution may have a pH of 6 to 8. This is because it is possible to prevent the aggregation of the copper nanoparticles to be produced, and when the pH of the third reactant solution is in an acidic or basic state that deviates from the above-described pH range, the particles may be aggregated each other, so that a phenomenon that the size of copper nanoparticles produced is increased, may occur. Accordingly, it is preferably that the third reactant solution is in a pH range of 6 to 8 in order to produce copper nanoparticles such that copper nanoparticles have a small size and excellent dispersity.

Further, where the pH of the third reactant solution is neutral in the production step which is a time point when the production of copper nanoparticles is completed, the residual solution remaining after the collection step is easily disposed of, and copper nanoparticles may be produced by an eco-friendly method.

The collection step may include a procedure of collecting copper nanoparticles separated from the third reactant solution. The collection step is a procedure of separating and collecting formed copper nanoparticles formed from the third reactant solution after the solution production step, the reaction step, and the production step, and may be applied as long as the method is any method for separating and collecting copper nanoparticles present in the solution from the solution, and preferably, it is possible to collect copper nanoparticles by using a centrifuge.

The collected copper nanoparticles may be subjected to washing and drying procedures by a conventional method, and it is possible to obtain excellent oxidation resistant copper nanoparticles of the present invention.

The copper nanoparticles may be spherical or needle-shaped, and have a particle diameter of less than 200 nm, and a particle diameter of 5 nm to 200 nm. Further, it is possible to produce copper nanoparticles having a size of 10 nm or less, and preferably 5 nm to 10 nm.

The oxidation resistant copper nanoparticles according to another exemplary embodiment of the present invention include copper nanoparticles and a reduced polymer layer surrounding the copper nanoparticles. The oxidation resistant copper nanoparticles may be produced by a method for producing copper nanoparticles according to an exemplary embodiment of the present invention, and the shape thereof may be spherical or needle-shaped, and the nanoparticles have excellent oxidation resistant properties while being produced by using water as a solvent, and thus, may maintain oxidation resistant properties for 90 days under the conditions of air atmosphere and 20° C.

The polymer layer included in the oxidation resistant copper nanoparticles may be a polymer from which the $O^{2-}$ group is removed. It may be possible to prepare excellent oxidation resistant copper nanoparticles in that a polymer layer has an effect of not only preventing oxidation resulting from the contact with the air, and the like, but also removing the $O^{2-}$ group contained in the polymer itself, and further suppressing oxidation of copper nanoparticles which may be formed during the procedure of forming the polymer layer, because the oxidation resistant copper nanoparticles are surrounded by the polymer layer.

The oxidation resistant copper nanoparticles may have a pH of 6 to 8, and in this case, it is possible to prevent a phenomenon in which particles aggregate, and produce copper nanoparticles having excellent dispersity.

The oxidation resistant copper nanoparticles may be produced by appropriately adjusting the size, and particularly, copper nanoparticles having a micro-size of 10 nm or less may be produced, and oxidation resistant copper nanoparticles having a size of 5 to 10 nm may be provided.

The copper ink according to still another exemplary embodiment of the present invention includes the oxidation resistant copper nanoparticles. The copper ink may be preserved for 90 days or more while a copper state which is not oxidized is maintained due to excellent oxidation resistant properties of the oxidation resistant copper nanoparticles, and may have excellent printing quality since the oxidation resistant copper nanoparticles having a micro particle size and excellent dispersity are applied.

According to the method for producing copper nanoparticles of the present invention, there is an advantage in that reactions are conducted in a process at room temperature, no additional process is needed, and the process may be simplified, and water may be applied as a solvent, so that copper nanoparticles may be produced by an eco-friendly and inexpensive method. Furthermore, copper nanoparticles with improved oxidation resistant properties may be produced, so that it is possible to produce copper nanoparticles which may be applied to the formation of a conductive pattern, and the like by a relatively inexpensive and simple method as compared to gold and silver.

In contrast to the fact that general copper nanoparticles are rapidly oxidized, the produced copper nanoparticles of this invention may have excellent oxidation resistant properties in which the copper nanoparticles are not oxidized at room temperature under air condition for one or more months. These characteristics may allow copper nanoparticles having excellent oxidation resistant properties to be produced by a simple process at room temperature under air atmosphere, and prepare oxidation resistant copper nanoparticles in a massive manner.

EFFECTS OF THE PRESENT INVENTION

The method for producing copper nanoparticles of the present invention provides a method for producing copper nanoparticles, in which reactions are conducted under the conditions of room temperature and air atmosphere without a need for an additional process. Further, the production method may use various solvents as a solvent, and a watery solvent such as water may also be used, so that it is possible to massively produce copper nanoparticles by an eco-friendly method. In addition, the produced copper nanoparticles have small and uniform particles, and have excellent oxidation resistant properties to prevent them from being oxidized for three months or more even when preserved at room temperature under air condition, and thus, may be applied to an ink for forming a conductive pattern in an electronic device, such as a display RFID.

MODES FOR CARRYING OUT THE PREFERRED EMBODIMENTS

Hereinafter, exemplary embodiments of the present invention will be described in detail with reference to accompanying drawings, such that those skilled in the art to which the present invention pertains can easily carry out the present invention. However, the present invention can be implemented in various different forms, and is not limited to the exemplary embodiments described herein.

Example 1—Production of Copper Nanoparticles 200 ml of DI water as a solvent, 0.5404 g of ascorbic acid, and 1.0045 g of a polymer polyvinylpyrrolidone were mixed to prepare a first solution, and the first solution was completely dissolved by a mechanical stirring at room temperature (about 25° C.) to produce a first stirred solution (solution production step).

During stirring the first stirred solution, 0.3760 g of copper(II) sulfate pentahydrate ($CuSO_4 \cdot 5H_2O$) as a copper precursor was mixed with the first stirred solution to prepare a second solution, and the second solution was reacted for 1 hour to produce a first reactant solution (first reaction step).

6.0675 g of sodium hydroxide as a first reducing agent was put into the first reactant solution, and the mixture was reacted for 1 hour to produce a second reactant solution (second reaction step).

0.5635 g of sodium borohydride as a second reducing agent was put into the second reactant solution, and the mixture was reacted for 1 hour to produce a third reactant solution (production step).

When the color of the third reacting solution turned black, the reaction was terminated, and the copper nanoparticles formed were separated and collected (collection step). The separation and collection was conducted by using a centrifuge, the separated copper nanoparticles were washed three times by using alcohol or DI water, and dried in an oven to obtain copper nanoparticles.

Figure 1:
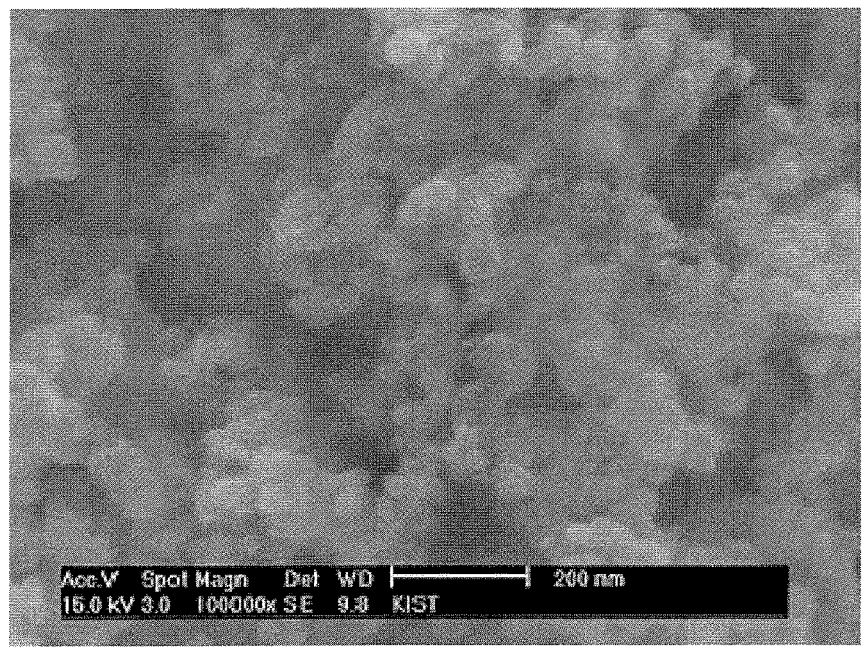
FIG. 1 is a scanning electron microscope (SEM) photograph of copper nanoparticles produced according to Example 1 of the present invention.
Figure 2:
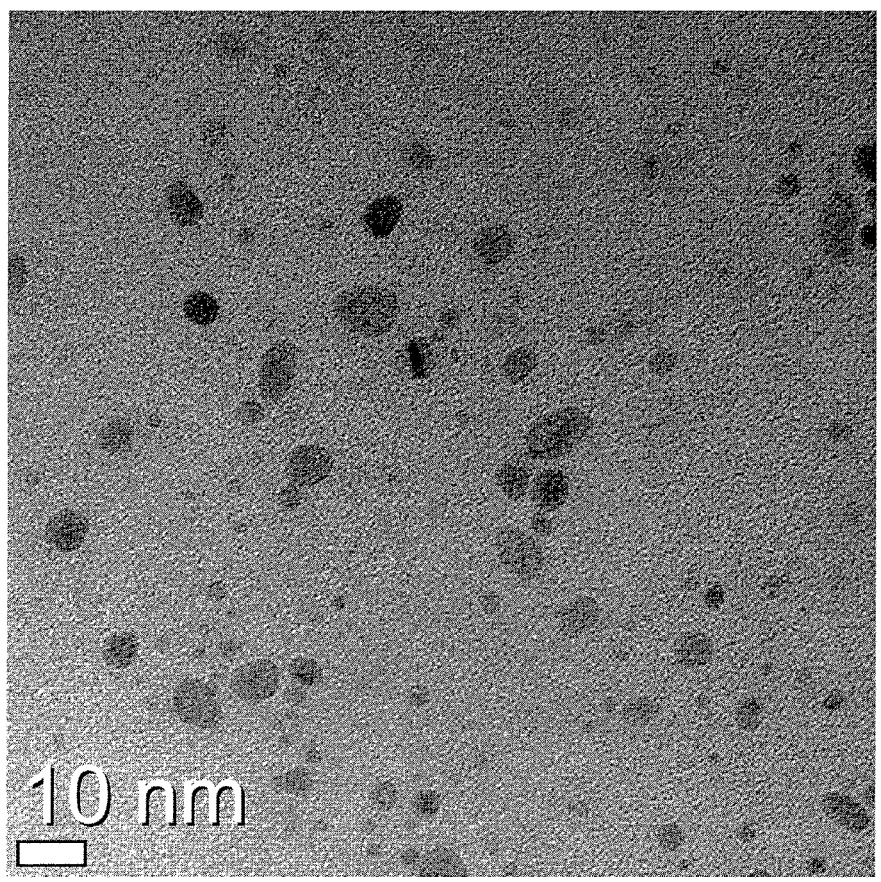
FIG. 2 is a transmission electron microscope (TEM) photograph of copper nanoparticles produced according to Example 1 of the present invention.

The collected copper nanoparticles of Example 1 were observed by a scanning electron microscope (SEM) photograph and a transmission electron microscope (TEM) photograph, and the photographs are shown in FIGS. 1 and 2, respectively. Referring to FIGS. 1 and 2, it was observed that the copper nanoparticles produced according to Example 1 had a size of 5 to 10 nm, and the forms thereof were spherical.

Example 2—Production of Copper Nanoparticles 200 ml of DI water as a solvent, 0.5427 g of ascorbic acid, and 1.0060 g of a polymer polyvinylpyrrolidone were mixed to prepare a first solution, and the first solution was completely dissolved by a mechanical stirring at room temperature (about 25° C.) to produce a first stirred solution (solution production step).

During stirring the first stirred solution, 0.3748 g of copper(I) chloride (CuCl) as a copper precursor was mixed with the first stirred solution to prepare a second solution, and the second solution was reacted for 1 hour to produce a first reactant solution (first reaction step).

6.0632 g of sodium hydroxide as a first reducing agent was put into the first reactant solution, and the mixture was reacted for 1 hour to produce a second reactant solution (second reaction step).

0.5676 g of sodium borohydride as a second reducing agent was put into the second reactant solution, and the mixture was reacted for 1 hour to produce a third reactant solution (production step).

When the color of the third reacting solution turned black, the reaction was terminated, and the copper nanoparticles formed were separated and collected (collection step). The separation and collection was conducted by using a centrifuge, the separated copper nanoparticles were washed three times by using alcohol or DI water, and dried in an oven to obtain copper nanoparticles.

Figure 3:
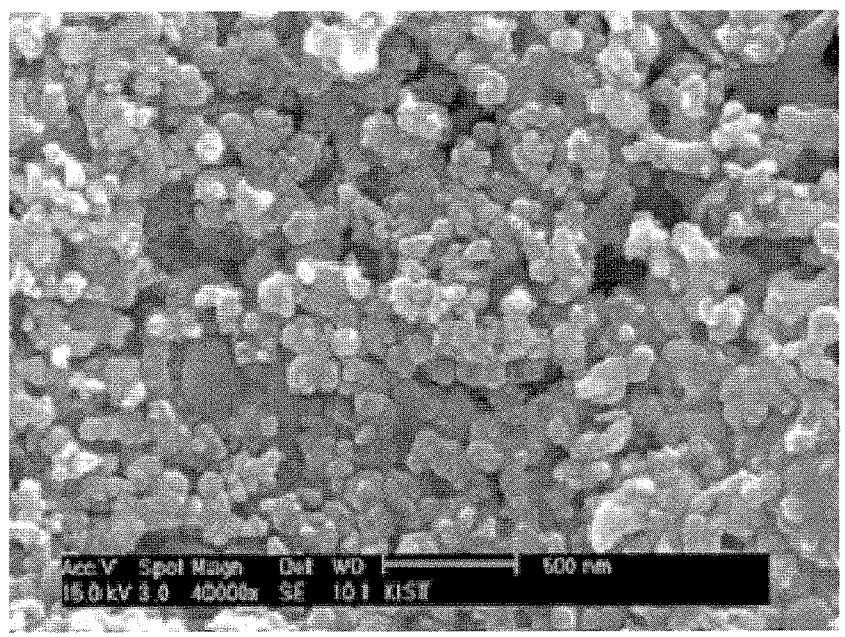
FIG. 3 is a scanning electron microscope (SEM) photograph of copper nanoparticles produced according to Example 2 of the present invention.
Figure 4:
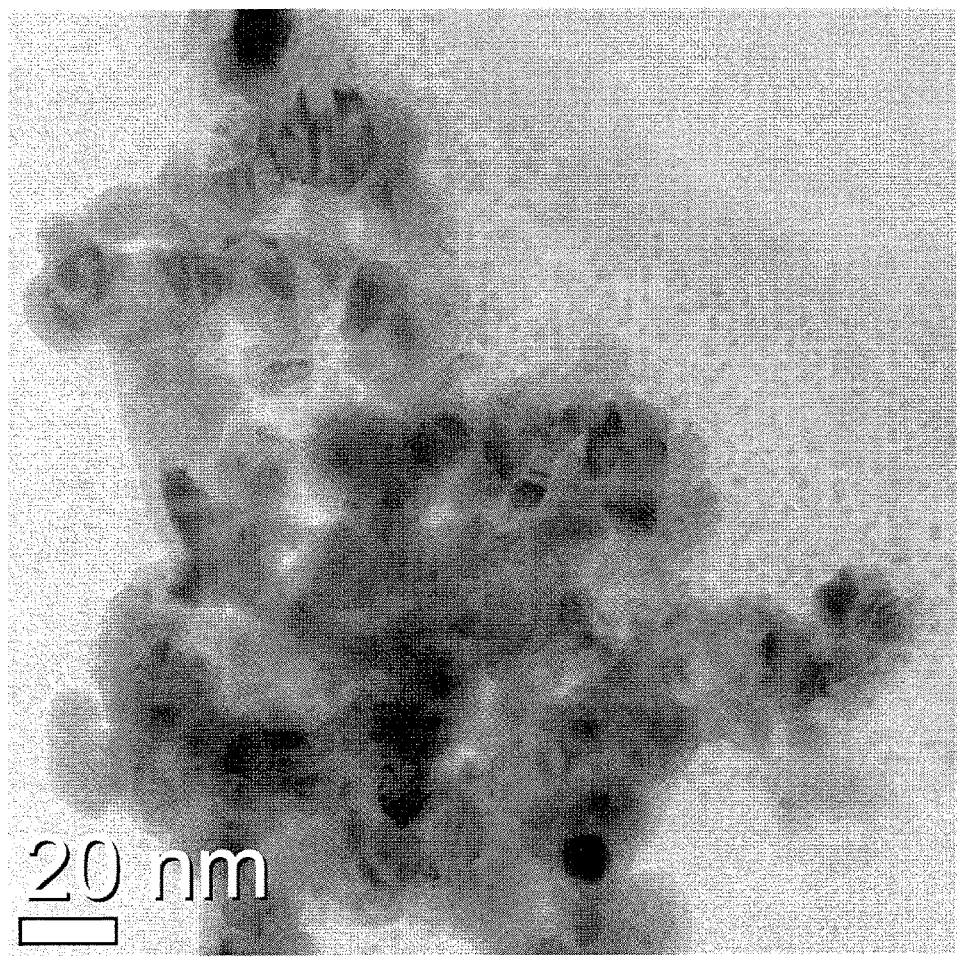
FIG. 4 is a transmission electron microscope (TEM) photograph of copper nanoparticles produced according to Example 2 of the present invention.

The collected copper nanoparticles of Example 2 were observed by a scanning electron microscope (SEM) photograph and a transmission electron microscope (TEM) photograph, and the photographs are shown in FIGS. 3 and 4, respectively. Referring to FIGS. 3 and 4, it was observed that the copper nanoparticles produced according to Example 2 had a size of 30 to 50 nm, and the forms thereof were spherical.

Example 3—Production of Copper Nanoparticles 200 ml of DI water as a solvent, 0.5451 g of ascorbic acid, and 1.0054 g of a polymer polyvinylpyrrolidone were mixed to prepare a first solution, and the first solution was completely dissolved by a mechanical stirring at room temperature (about 25° C.) to produce a first stirred solution (solution production step).

During stirring first stirred solution, the 0.3730 g of copper nitrate ($Cu(NO_3)_2$) as a copper precursor was mixed with the first stirred solution to prepare a second solution, and the second solution was reacted for 1 hour to produce a first reactant solution (first reaction step).

6.0607 g of sodium hydroxide as a first reducing agent was put into the first reactant solution, and the mixture was reacted for 1 hour to produce a second reactant solution (second reaction step).

0.5610 g of sodium borohydride as a second reducing agent was put into the second reactant solution, and the mixture was reacted for 1 hour to produce a third reactant solution (production step).

When the color of the third reacting solution turned black, the reaction was terminated, and the copper nanoparticles formed were separated and collected (collection step). The separation and collection was conducted by using a centrifuge, the separated copper nanoparticles were washed three times by using alcohol or DI water, and dried in an oven to obtain copper nanoparticles.

Figure 5:
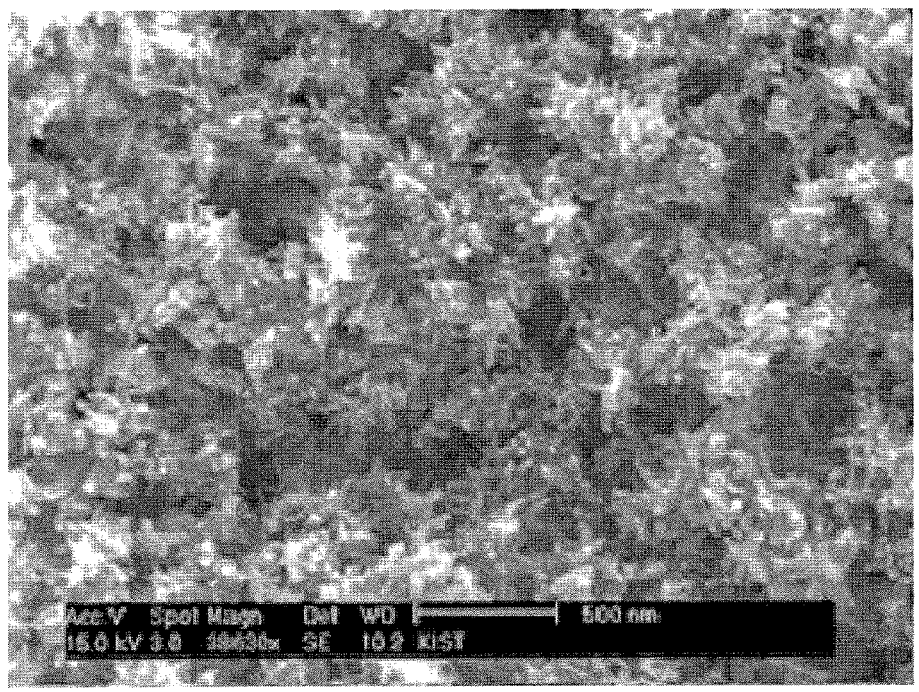
FIG. 5 is a scanning electron microscope (SEM) photograph of copper nanoparticles produced according to Example 3 of the present invention.
Figure 6:
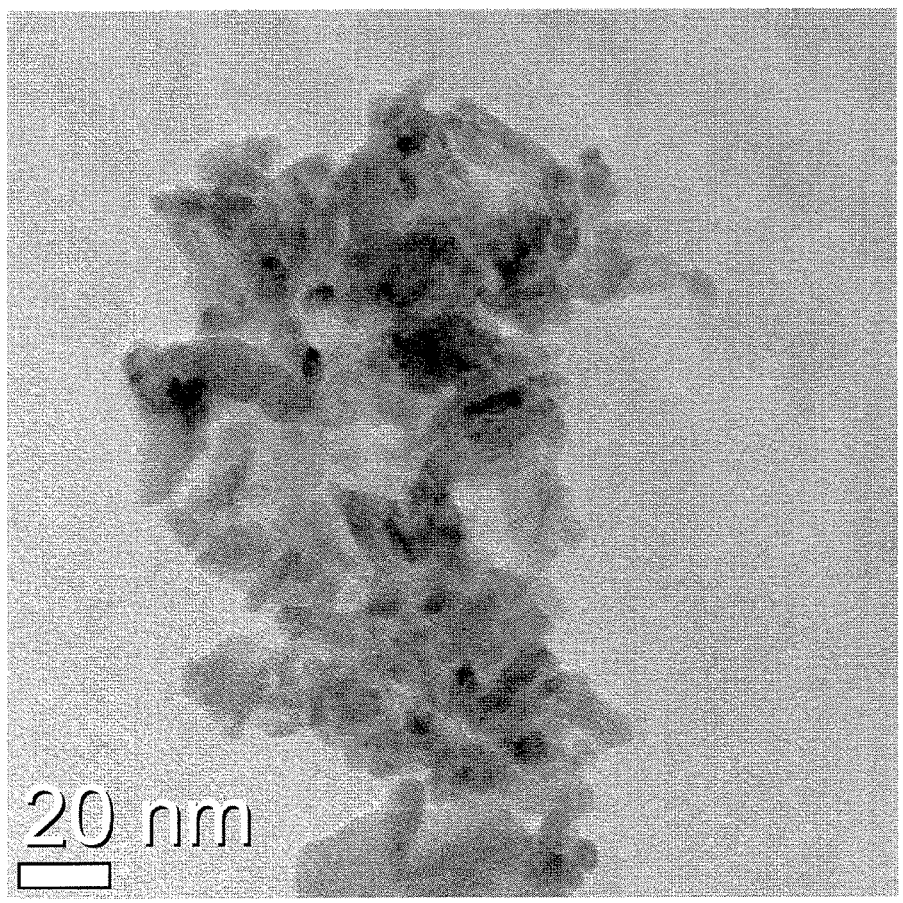
FIG. 6 is a transmission electron microscope (TEM) photograph of copper nanoparticles produced according to Example 3 of the present invention.

The collected copper nanoparticles of Example 3 were observed by a scanning electron microscope (SEM) photograph and a transmission electron microscope (TEM) photograph, and the photographs are shown in FIGS. 5 and 6, respectively. Referring to FIGS. 5 and 6, it was observed that the copper nanoparticles produced according to Example 3 had a size of 100 to 130 nm, and the forms thereof were needle-shaped.

Example 4—Production of Copper Nanoparticles 200 ml of DI water as a solvent, 0.5406 g of ascorbic acid, and 1.0085 g of a polymer polyvinylpyrrolidone were mixed to prepare a first solution, and the first solution was completely dissolved by a mechanical stirring at room temperature (about 25° C.) to produce a first stirred solution (solution production step).

During stirring the first stirred solution, 0.3724 g of copper(II) acetate ($Cu(OAc)_2$) as a copper precursor was mixed with the first stirred solution to prepare a second solution, and the second solution was reacted for 1 hour to produce a first reactant solution (first reaction step).

6.0636 g of sodium hydroxide as a first reducing agent was put into the first reactant solution, and the mixture was reacted for 1 hour to produce a second reactant solution (second reaction step).

0.5663 g of sodium borohydride as a second reducing agent was put into the second reactant solution, and the mixture was reacted for 1 hour to produce a third reactant solution (production step).

When the color of the third reacting solution turned black, the reaction was terminated, and the copper nanoparticles formed were separated and collected (collection step). The separation and collection was conducted by using a centrifuge, the separated copper nanoparticles were washed three times by using alcohol or DI water, and dried in an oven to obtain copper nanoparticles.

Figure 7:
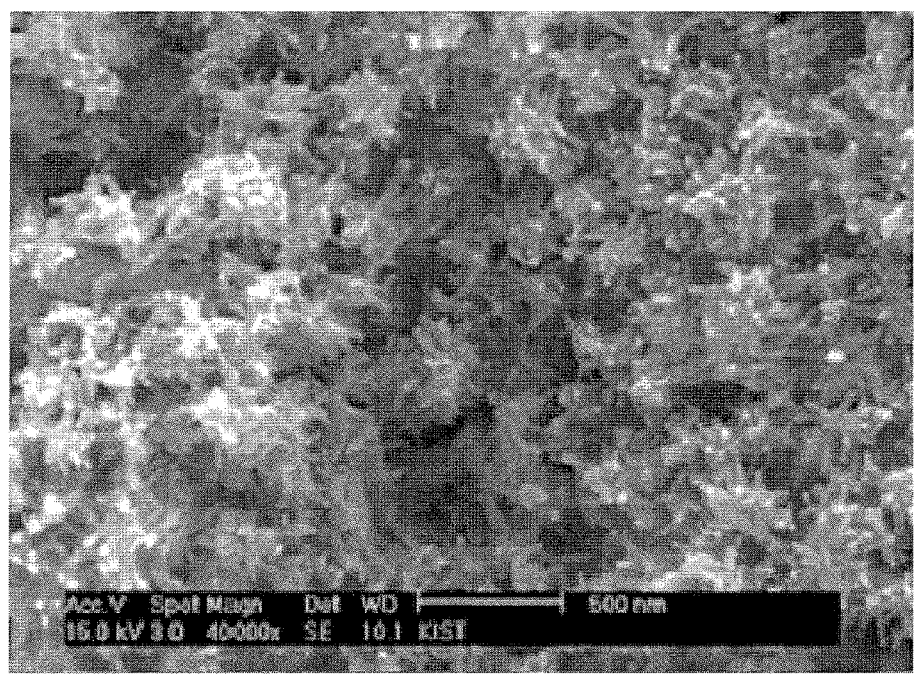
FIG. 7 is a scanning electron microscope (SEM) photograph of copper nanoparticles produced according to Example 4 of the present invention.
Figure 8:
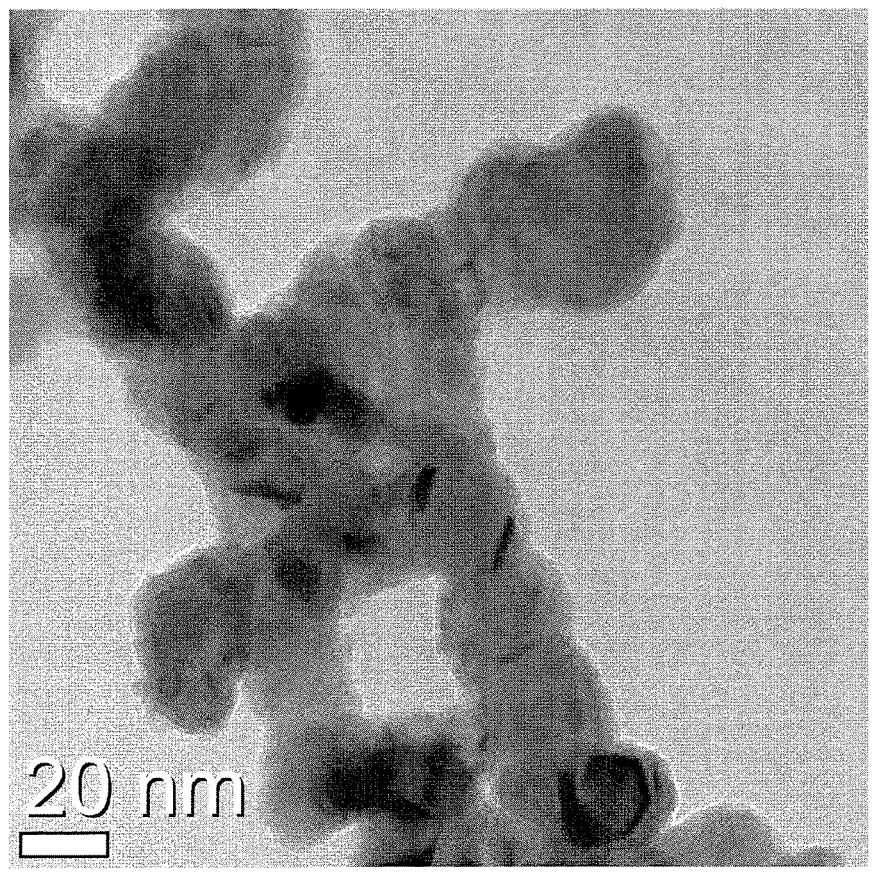
FIG. 8 is a transmission electron microscope (TEM) photograph of copper nanoparticles produced according to Example 4 of the present invention.

The collected copper nanoparticles of Example 4 were observed by a scanning electron microscope (SEM) photograph and a transmission electron microscope (TEM) photograph, and the photographs are shown in FIGS. 7 and 8, respectively. Referring to FIGS. 7 and 8, the copper nanoparticles produced according to Example 4 had a size of 150 to 200 nm, and the forms thereof were needle-shaped.

Figure 9:
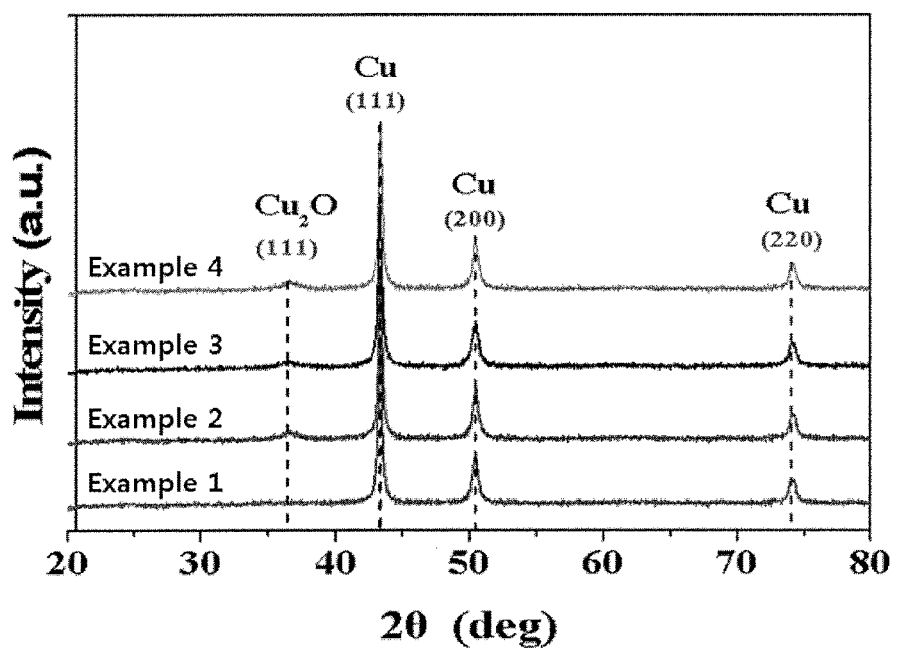
FIG. 9 is an XRD phase analysis result of copper nanoparticles produced according to Examples 1 to 4 of the present invention.

Measurement Example—Measurement of Oxidation Resistant Properties through X-Ray Diffraction Analysis 1) XRD peaks were measured by using copper nanoparticles of Examples 1 to 4, and the results were shown in FIG. 9. Referring to FIG. 9, it can be confirmed that copper nanoparticles of Examples 1 to 4 are all copper particles, and in particular, it was confirmed that the copper nanoparticles of Example 1 were pure copper nanoparticles which were not oxidized because the peak corresponding to the copper oxide does not appear.

Figure 10:
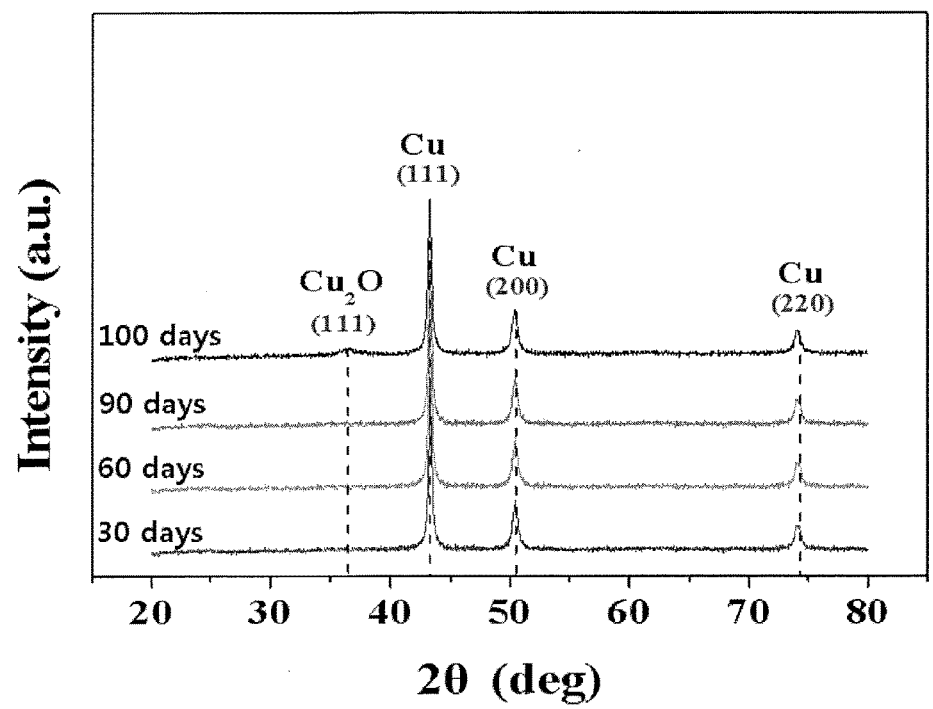
FIG. 10 is a phase analysis result of XRD measured at each period after copper nanoparticles produced according to Example 1 of the present invention are preserved under air atmosphere for 30 to 100 days.

2) After the copper nanoparticles of Example 1 were preserved at room temperature (about 25° C.) under air atmosphere for 30 days, the XRD was measured, and the results are shown in FIG. 10. Referring to FIG. 10, it can be confirmed that the copper nanoparticles of Example 1 preserved under air atmosphere for 30 days were pure copper nanoparticles which were not oxidized because the peak corresponding to copper oxide does not appear, and it can be confirmed that the copper nanoparticles of Example 1 of the present invention have excellent oxidation resistant properties.

3) After the copper nanoparticles of Example 1 were preserved at room temperature (about 25° C.) under air atmosphere for 100 days, the XRD was measured, and the results are shown in FIG. 10. Referring to FIG. 10, the peak corresponding to copper oxide was observed from the copper nanoparticles of Example 1, which were preserved under air atmosphere for 100 days, so that it can be confirmed that oxidation slightly occurred in the sample in which 100 days had elapsed.

In the result of the measurement example, the copper nanoparticles of Example 1 were easily oxidized in a state of powder which is brought into contact with the air at room temperature within usually 7 days, whereas it can be confirmed that the present invention was present in a form of pure copper nanoparticles which were not oxidized even when preserved for at least 30 days or 90 days, and this is a result that the copper nanoparticles of the present invention has excellent oxidation resistant properties.

Although preferred examples of the present invention have been described in detail hereinabove, the right scope of the present invention is not limited thereto, and it should be clearly understood that many variations and modifications of those skilled in the art using the basic concept of the present invention, which is defined in the following claims, will also belong to the right scope of the present invention.

INDUSTRIAL APPLICATION

In the method for producing copper nanoparticles of the present invention, various solvent may be used as a solvent, and a watery solvent such as water may also be used, so that it is possible to mass-produce copper nanoparticles by an eco-friendly method. Further, the copper nanoparticles produced have excellent oxidation resistant properties, and thus, may be applied to an ink for forming a conductive patter in an electronic material such as a display RFID.

The invention claimed is:

1. A method for producing copper nanoparticles, comprising the steps of:
  preparing a first solution by stirring together a solvent, a polymer, and an organic acid, wherein the polymer is selected from the group consisting of polyacetylene, polyaniline, polypyrrole, polythiophene, poly(3,4-ethylenedioxythiophene) and a combination thereof,
  wherein the organic acid is selected from the group consisting of erythorbic acid, glucuronolactone, triformin (2,3-diformyloxypropyl formate) and a combination thereof;
  producing a second solution by mixing the first solution, a copper precursor, and a first reducing agent;
  producing a third solution by mixing a second reducing agent with the second solution for 30 minutes to 5 hours; and
  separating and collecting copper nanoparticles from the third solution.

2. The method of claim 1, wherein the polymer is polyaniline.

3. The method of claim 1, wherein the polymer is poly(3,4-ethylenedioxythiophene).

4. The method of claim 1, wherein the polymer is polyacetylene.

5. The method of claim 1, wherein the polymer is polypyrrole.

6. The method of claim 1, wherein the polymer is polythiophene.

7. The method of claim 1, wherein the organic acid is erythorbic acid.

8. The method of claim 1, wherein stirring is conducted by an ultrasonic dispersion treatment at 50 to 500 W for 1 to 20 minutes.

9. The method of claim 1, wherein the copper precursor is selected from the group consisting of copper sulfate ($CuSO_4$), copper(I) chloride (CuCl), copper(II) chloride ($CuCl_2$), copper nitrate ($Cu(NO_3)_2$), copper acetate ($CH_3COOCu$), copper carbonate ($CuCO_3$), copper(II) cyanide ($Cu(CN)_2$), copper(I) iodide (CuI), and a combination thereof.

10. The method of claim 1, wherein the first reducing agent and the second reducing agent are each independently selected from the group consisting of hydrazine ($N_2H_4$), sodium borohydride ($NaBH_4$), sodium chloride (NaCl), sodium hydroxide (NaOH), ammonium hydroxide ($NH_4OH$), potassium bromide (KBr), and a combination thereof.

11. The method of claim 1, wherein the solvent is any one selected from the group consisting of water, methanol, ethanol, butanol, acetone, isopropyl alcohol, ethylene glycol, diethylene glycol, toluene, N-methyl-2-pyrrolidone, and a combination thereof.

12. The method of claim 1, wherein the copper nanoparticles are spherical or needle-shaped.

13. The method of claim 1, wherein the copper nanoparticles have a size of 10 nm or less.

14. The method of claim 1, wherein the first reducing agent is applied at a molar ratio of 0.1 to 1 based on the copper precursor.

15. The method of claim 1, wherein the second reducing agent is applied at a molar ratio of 0.01 to 0.1 based on the copper precursor.

16. The method of claim 1, wherein the third solution has a pH of 6 to 8.

17. The method of claim 1, further comprising washing and drying the copper nanoparticles.

18. A method for producing copper nanoparticles, the method comprising:
  producing a first solution by stirring together a solvent, an organic acid, and a polymer to produce the first solution, wherein the polymer is selected from the group consisting of polyacetylene, polyaniline, polypyrrole, polythiophene, poly(3,4-ethylenedioxythiophene) and a combination thereof,
  wherein the organic acid is selected from the group consisting of erythorbic acid, glucuronolactone, triformin (2,3-diformyloxypropyl formate) and a combination thereof;
  producing a second solution by mixing the first solution, a copper precursor, and a first reducing agent;
  producing a third solution by mixing a second reducing agent with the second solution; and
  centrifuging the third solution to collect the copper nanoparticles from the third solution.

19. The method of claim 18, further comprising:
  washing the collected copper nanoparticles with alcohol or water; and
  drying the washed copper nanoparticles.

* * * * *